Figure 1:
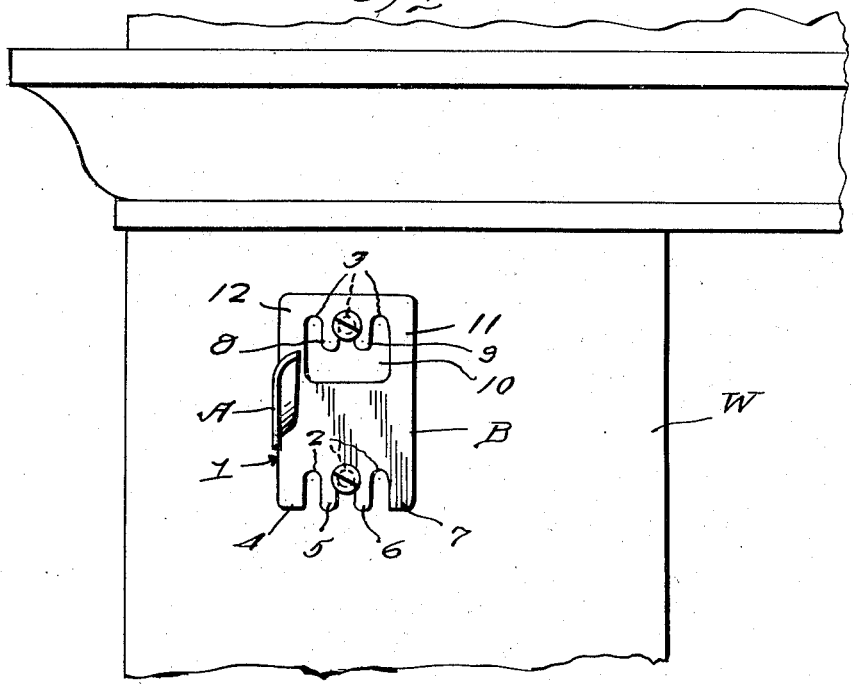

Feb. 22, 1949.  G. McCORMICK, JR  2,462,525
WINDOW SHADE BRACKET
Filed Aug. 24, 1945

Inventor
Guy Mc Cormick, Jr.

Attorneys

Patented Feb. 22, 1949

2,462,525

UNITED STATES PATENT OFFICE 2,462,525

WINDOW SHADE BRACKET

Guy McCormick, Jr., Newport News, Va.

Application August 24, 1945, Serial No. 612,417

1 Claim. (Cl. 248—271)

My invention relates to improvements in window shade brackets which are of such novel construction that a pair of them, although secured to a window frame, may be readily adjusted to different lengths of shade rollers.

It is an object of this invention to provide novel brackets whereby re-setting of brackets may be not only avoided, but the marring of the window frame by the repeated insertion of nails or screws for different bracket positions will be unnecessary.

Other objects and advantages of my novel invention will be revealed in connection with the detailed description of the accompanying drawings which are a part of this specification.

Figure 2:
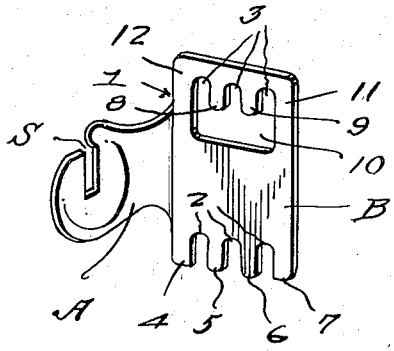

In the drawings:

Figure 1 is an elevation of the left hand bracket of a pair of brackets that are required to support a shade roller, and Figure 2 is a perspective view of my novel bracket.

In the specification and drawings the reference characters identify the detailed construction of my novel adjustable brackets.

The drawings are merely illustrative and not limiting except as claimed. It is also noted that the right hand bracket is not shown, but the right hand bracket would be otherwise identical in construction so far as the adjustable base is concerned. In the right hand bracket the supporting arm is provided with an aperture to receive the stub shaft of the shade roller, whereas the left hand bracket has a supporting arm provided with a slot s, as shown in Figure 2.

My improved bracket constitutes a bracket or body 1 having a broad base member B to accommodate the application thereto of a parallel series of slots 2 and 3 defining a series of depending lugs 4 to 9, inclusive. The opening 10 is provided with side bars 11 and 12 which are spaced from each other and represent the limit of longitudinal adjustment for the bracket 1. The bracket 1 is provided with an arm A projecting forwardly at substantially a right angle to the base B. It may be preferable to locate the arm A at the edge of the base B, but this is not an essential characteristic of my novel construction.

My improved bracket 1 is adapted to be adjustably secured to a suitable portion of a window frame W, as clearly indicated in Figure 1.

The bracket 1 is adapted to receive suitable fastening means such as nails or screws, etc. It may be preferable to use screws having rounded heads for a more desirable appearance and finish. If screws are used, they may be loosened slightly, if necessary, so as to shift the bracket 1 to any desired adjusted position. After the adjustment is made, the screws may again be tightened to securely hold the bracket in place. On the other hand, the screw heads may be loose enough to engage the lugs frictionally only and consequently the brackets would be supported in position by friction and the force of gravity.

In order to appreciate the range of adjustability of a pair of my brackets, let it be assumed that the length of the opening 10 in each bracket is three-fourths of an inch. The amount of relative longitudinal adjustment of the brackets would be one and one-half inches minus two times the diameter of the screw used as a fastener. Since each arm could be bent slightly to the right or to the left, at least, a distance equal the diameter of a fastening screw. It may be said that under the premises suggested, the range of adjustment including the bending of the arms is substantially one and one-half inches. It appears to be conclusive, therefore, that my novel brackets afford an adjustment to accommodate shade rollers varying in length by one and one-half inches without resetting the screws to different positions and consequently making new screw holes in the window frame.

Having fully described my said invention, what I claim is:

A shade roller bracket, comprising a flat vertical elongated plate, said plate having a main horizontal opening near its top forming reduced vertical strips, said plate being provided near its top and within the main opening with spaced vertical lugs, the lower ends of the lugs terminating near the longitudinal center of the main opening, the lugs and reduced strips defining vertical slots open at their lower ends, the plate being provided at its bottom edge with spaced vertical lugs forming vertical slots having their lower ends open and passing through the bottom edge, the lower lugs being longer than the upper lugs, the upper and lower slots being arranged in vertical pairs, the slots in each vertical pair being in vertical alignment, and a laterally extending arm secured to the vertical edge of the plate and having means to engage with the shade roller.

GUY McCORMICK, Jr.

REFERENCES CITED

The following references are of record in the file of this patent:

UNITED STATES PATENTS

| Number | Name | Date |
|---|---|---|
| 820,693 | Beam | May 15, 1906 |
| 1,110,111 | Cooper | Sept. 8, 1914 |
| 1,837,632 | Skowronski | Dec. 22, 1931 |